United States Patent
McAllister et al.

(10) Patent No.: US 9,989,175 B2
(45) Date of Patent: Jun. 5, 2018

(54) FLUID COMPONENT ADAPTER AND METHOD

(71) Applicant: Lasco Fittings, Inc., Brownsville, TN (US)

(72) Inventors: David A. McAllister, Lakeland, TN (US); Samuel P. Adams, Jackson, TN (US)

(73) Assignee: Lasco Fittings, Inc., Brownsville, TN (US)

( * ) Notice: Subject to any disclaimer, the term of this patent is extended or adjusted under 35 U.S.C. 154(b) by 1301 days.

(21) Appl. No.: 13/766,861

(22) Filed: Feb. 14, 2013

(65) Prior Publication Data

US 2013/0214531 A1    Aug. 22, 2013

Related U.S. Application Data

(60) Provisional application No. 61/601,271, filed on Feb. 21, 2012.

(51) Int. Cl.
*F16L 19/02* (2006.01)
(52) U.S. Cl.
CPC ................................. *F16L 19/02* (2013.01)
(58) Field of Classification Search
CPC ...................................................... F16L 19/02
USPC ............... 285/340, 343, 347, 363–364, 368, 285/405–406, 411–412, 354, 386–387, 285/389, 89, 93, 913–914
See application file for complete search history.

(56) References Cited

U.S. PATENT DOCUMENTS

| | | | | |
|---|---|---|---|---|
| 433,750 A * | 8/1890 | Shields | ................... | F16L 19/04 277/617 |
| 587,347 A * | 8/1897 | Waite | .................. | F16L 19/0286 285/332.2 |
| 1,075,693 A * | 10/1913 | Cassidy | .............. | F16L 27/0816 285/281 |
| 1,242,568 A * | 10/1917 | Loughridge et al. | ... | F16L 19/02 285/148.19 |
| 1,851,992 A * | 4/1932 | Smith | ................... | F16L 37/248 285/148.13 |
| 4,225,162 A * | 9/1980 | Dola | ....................... | F16L 25/01 174/665 |
| 4,275,907 A * | 6/1981 | Hunt | ..................... | F16L 37/133 251/149.1 |

(Continued)

*Primary Examiner* — Aaron M Dunwoody
*Assistant Examiner* — Fannie C Kee
(74) *Attorney, Agent, or Firm* — Calfee, Halter & Griswold LLP

(57) ABSTRACT

An exemplary adapter configured as a transition between a fitting and a fluid system component. In one exemplary embodiment, the adapter is configured as a transition between a compression fitting and a fluid system component. The adapter comprises a body portion, a compression portion, and a flange portion. A first end of the body portion is inserted into a port of the compression fitting and the compression portion compresses a resilient seal against a sealing shoulder of the fitting. A nut of the compression fitting engages the flange portion of the adapter to connect the adapter to the compression fitting. A second end of the body portion is connected to a fluid system component. The adapter provides a fluid tight connection between the compression fitting and the fluid system component without using a gasket ring or a locking ring of the compression fitting.

7 Claims, 13 Drawing Sheets

(56) References Cited

U.S. PATENT DOCUMENTS

| | | | | |
|---|---|---|---|---|
| 4,702,503 | A * | 10/1987 | von Koch | F16B 5/0241 |
| | | | | 285/330 |
| 4,993,755 | A * | 2/1991 | Johnston | F16L 37/133 |
| | | | | 285/315 |
| 5,051,541 | A * | 9/1991 | Bawa | F16L 33/223 |
| | | | | 174/655 |
| 5,116,085 | A * | 5/1992 | Carrel | F16L 27/12 |
| | | | | 277/634 |
| 7,156,424 | B2 * | 1/2007 | McCord | F16L 19/005 |
| | | | | 285/319 |
| 2010/0171309 | A1 * | 7/2010 | Kainec | F16L 19/065 |
| | | | | 285/382 |

* cited by examiner

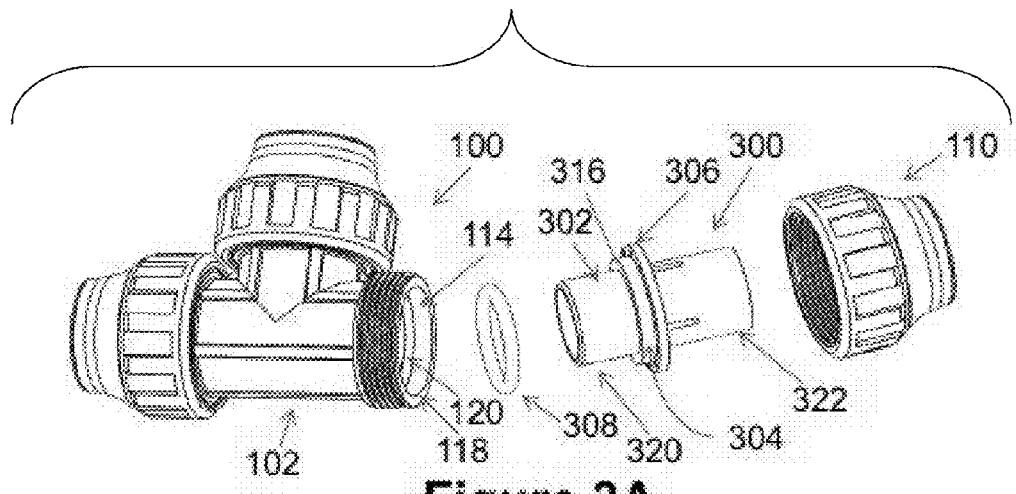
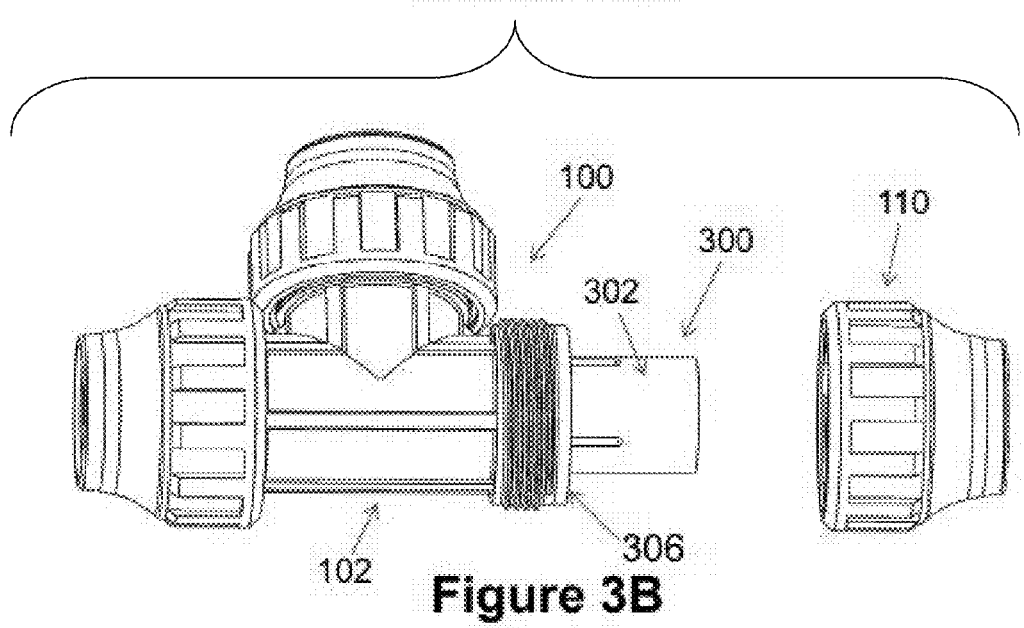

FLUID COMPONENT ADAPTER AND METHOD

CROSS REFERENCE TO RELATED APPLICATION

This application is a U.S. Non-Provisional Patent Application which claims priority to U.S. Provisional Patent Application No. 61/601,271, filed on Feb. 21, 2012 and titled "Fluid Component Adapter and Method," which is hereby incorporated by reference in its entirety.

FIELD OF THE INVENTION

The present application relates generally to a device and method for fluidly connecting various components of fluid systems together. More specifically, the present application relates to an adapter configured as a transition between components in a fluid system.

BACKGROUND

Fluid systems often include various types of fittings to connect two or more pieces of piping together. One type of fitting that is often used is a compression fitting. Many compression fittings are made from a polyolefin, such as polyethylene ("PE") or polypropylene ("PP"), and often include components, such as a locking ring or gripping member, that engage the outer surface of the pipe to connect the pipe to the fitting. Furthermore, some compression fittings include a threaded connection for attaching a threaded system component to the fitting.

SUMMARY

The present application discloses an exemplary adapter configured as a transition between a fitting and a fluid system component, methods for adjusting the adapter, and methods for connecting the adapter to the fluid system component.

In one exemplary embodiment, the adapter is configured as a transition between a compression fitting and a fluid system component. The adapter comprises a body portion, a compression portion, and a flange portion. A first end of the body portion is inserted into a port of the compression fitting and the compression portion compresses a resilient seal against a sealing shoulder of the fitting. A nut of the compression fitting engages the flange portion of the adapter to connect the adapter to the compression fitting. A second end of the body portion is connected to a fluid system component. In another exemplary embodiment, the compression portion of the adapter is movable and adjustable relative to the body portion. The adapter provides a fluid tight connection between the compression fitting and the fluid system component without using a gasket ring or a locking ring of the compression fitting.

Further aspects and concepts will become apparent to those skilled in the art after considering the following description and appended claims in conjunction with the accompanying drawings.

BRIEF DESCRIPTION OF THE DRAWINGS

In the accompanying drawings, which are incorporated in and constitute a part of the specification, embodiments of the invention are illustrated, which, together with a general description of the invention given above, and the detailed description given below, serve to exemplify embodiments of the invention.

FIGS. 3A-3C are perspective views illustrating the connection of an exemplary adapter to a compression fitting and a fluid system component according to an embodiment of the present application.

DETAILED DESCRIPTION

The present application discloses an adapter configured as a transition between a fitting and a fluid system component, such as for example, an elbow, coupling, bushing, union, reducer, tee, cross, valve, pipe, or other fluid system component. While the exemplary embodiments illustrated and described herein are presented in the context of an adapter between a compression fitting and a threaded fluid system component, those skilled in the art will readily appreciate that the present invention may be used and configured in other ways.

For example, the adapter of the present application may be used in any application where a transition between a fitting and a fluid system component would be beneficial. This may include residential irrigation, commercial irrigation, or some other non-irrigation or non-sprinkler system application. In addition, the adapter may attach to a fluid system component in any manner suitable to provide leak-free fluid communication, such as for example, with use of a threaded, fused, solvent welded, or crimped connection. Further, the adapter may be used to attach fluid system components made of various materials, such as for example, high density polyethylene ("HDPE") or polyvinyl chloride ("PVC") components. Still further, in certain embodiments, the adapter is tubular in shape; however, the adapter may be configured in any manner suitable for providing fluid communication between a fitting and a fluid system component.

Figure 1A:
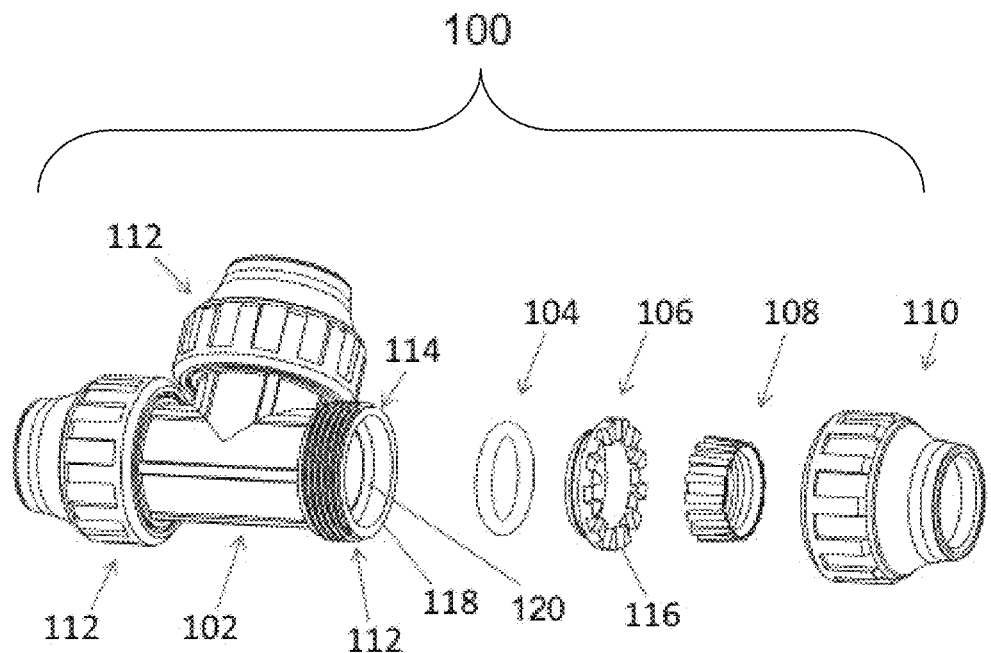
FIG. 1A is an exploded perspective view illustrating an exemplary compression fitting.

FIG. 1A illustrates an exemplary compression fitting 100 designed to connect two or more pieces of pipe together. The compression fitting 100 includes a body 102 and three pipe connections 112, two end connections and an intermediate connection. One end connection is shown disassembled in FIG. 1A. As illustrated in FIG. 1A, each connection 112 of the compression fitting 100 includes a resilient o-ring 104, a rigid gasket ring 106, a rigid gripping member or locking ring 108, and a nut 110 that is threaded onto the body 102 of the fitting.

When a pipe is attached to the compression fitting 100, the o-ring 104, gasket ring 106, locking ring 108, and nut 110 are slid over an end of the pipe in the order illustrated in FIG. 1A and the end of the pipe is inserted into a port 114 of the body 102. As shown, the port 114 has annular face 118. As the nut 110 is tightened onto the body 102, an inner surface of the nut abuts an outer surface of the locking ring 108 to move the locking ring axially and compress the locking ring against the outer surface of the pipe to restrict movement of the pipe. Further, the locking ring 108 engages an annular flange 116 of the gasket ring 106 to move the gasket ring axially and compress the o-ring 104 against an annular sealing shoulder 120 within the port 114 of the body 102 which increases the compression force of the seal against the body and the pipe.

Figure 1B:
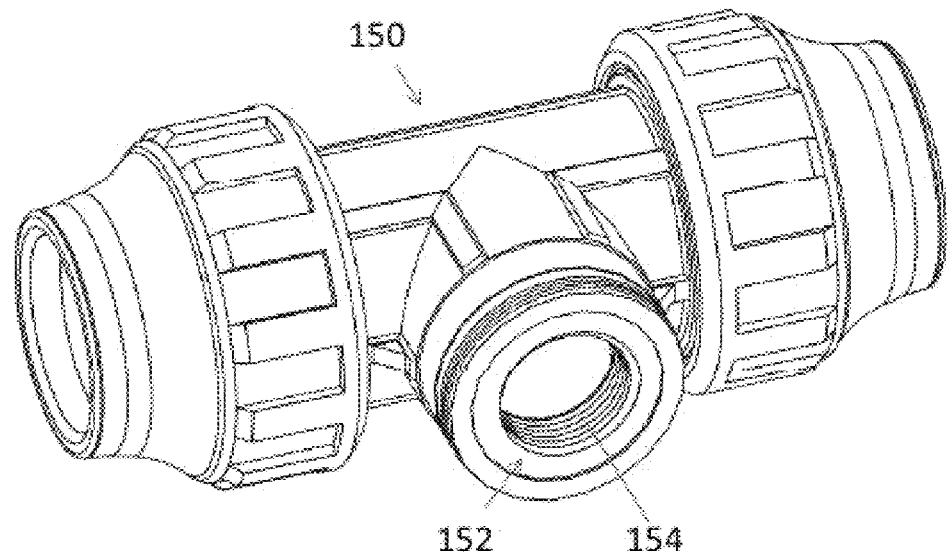
FIG. 1B is a perspective view illustrating an exemplary compression fitting having a threaded connection.
Figure 2A:
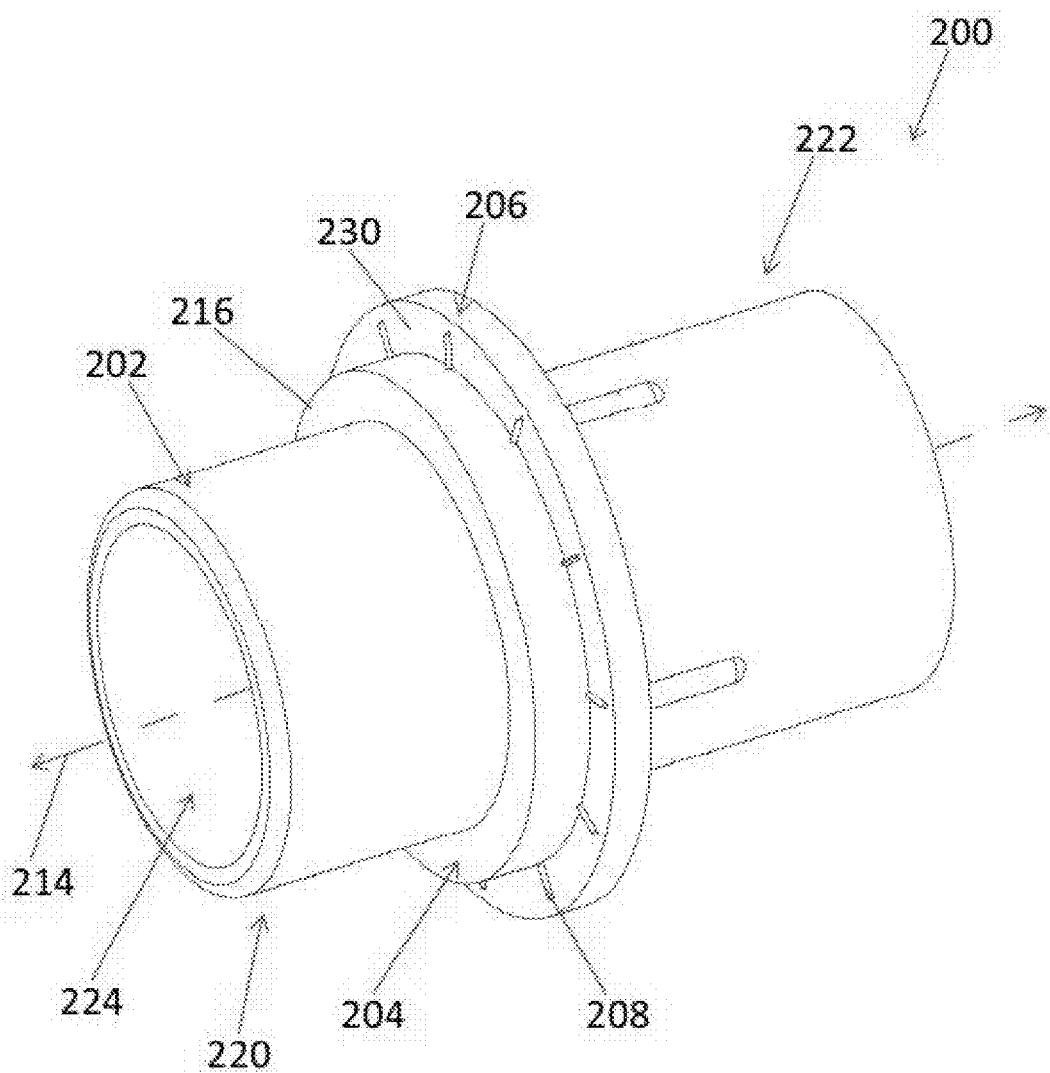
FIGS. 2A-2C are front perspective, rear perspective, and side views, respectively, of an exemplary adapter according to an embodiment of the present application.
Figure 2B:
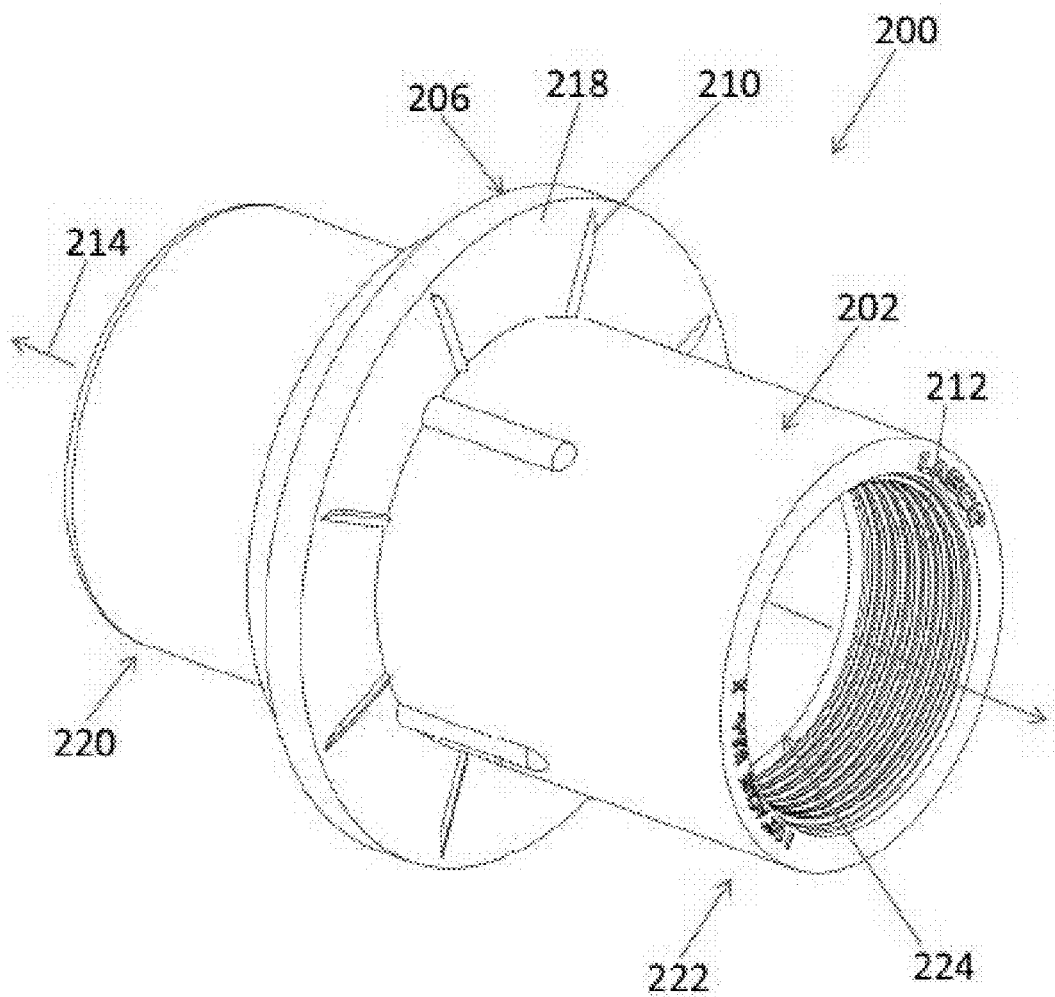
Figure 2C:
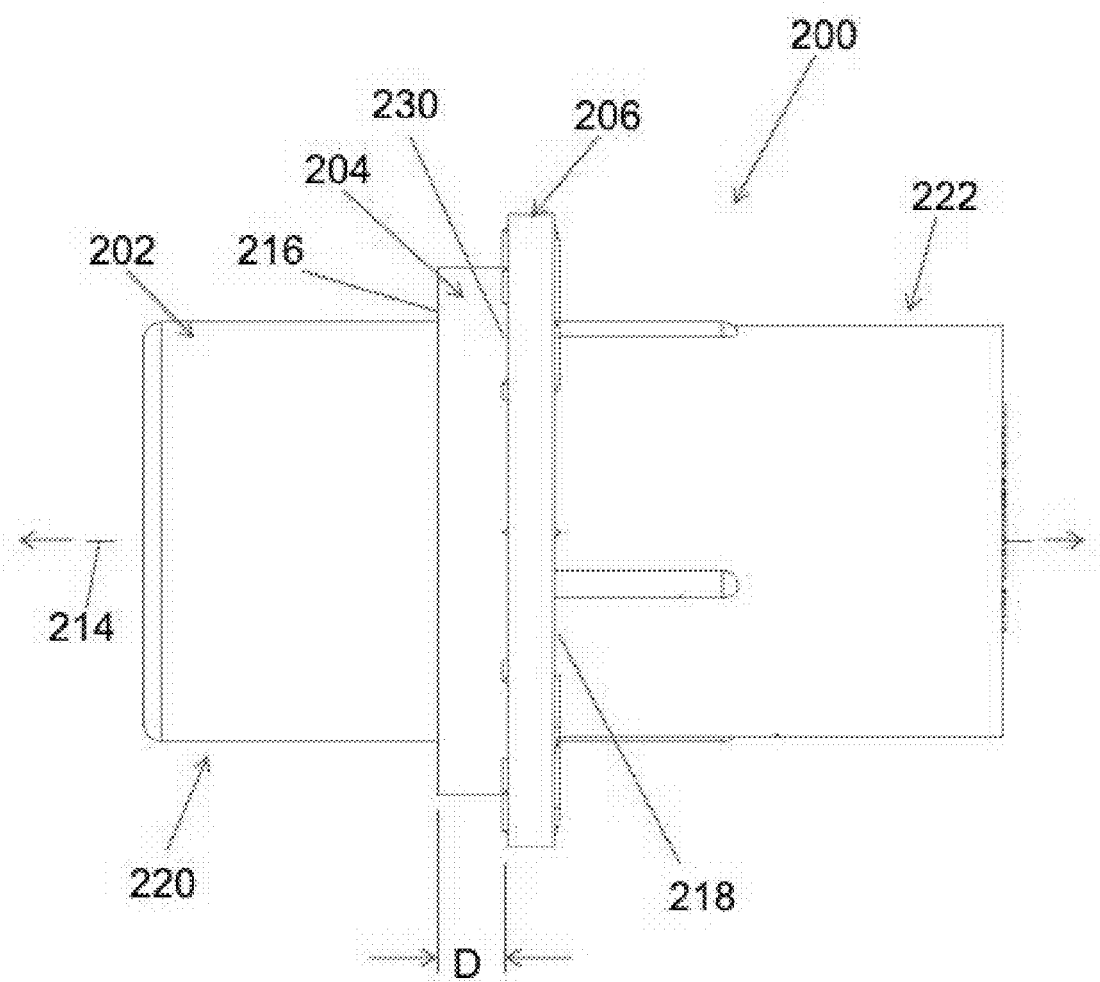

FIGS. 2A-2C illustrate an adapter 200 according to an embodiment of the present application. The adapter 200 is configured as a transition between a compression fitting, such as for example, the compression fitting 100 shown in FIG. 1, and a fluid system component. The adapter 200 comprises a body portion 202, a compression portion 204, and a flange portion 206. The adapter 200 is formed from a unitary piece of material; however, in other embodiments, the adapter may be formed from a plurality of components attached or otherwise secured together. The adapter 200 may also be formed from a variety of materials. In one embodiment, the adapter 200 is molded from a suitable plastic, such as PVC. In another embodiment, the adapter 200 is formed from a metallic material, such as for example, stainless steel.

As illustrated in FIGS. 2A-2C, the body portion 202 of the adapter 200 is tubular in shape and comprises a first end 220 and a second end 222. The first end 220 of the body portion 202 is inserted into the compression fitting and the second end 222 is connected to the fluid system component. Further, the body portion 202 of the adapter 200 comprises an outer surface and an interior channel 224 that defines a flow path along a longitudinal axis 214 of the adapter.

Figure 3C:
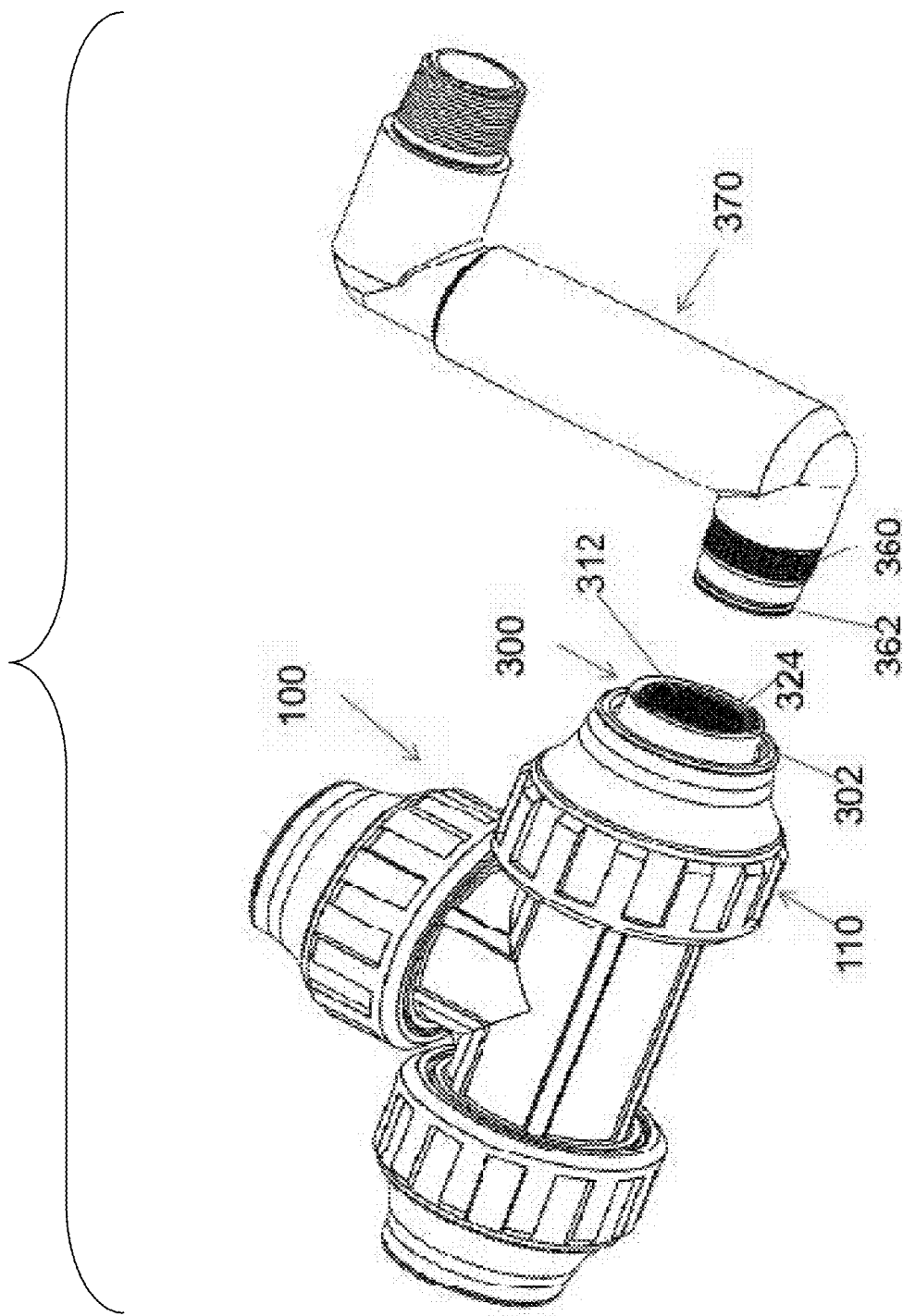

FIGS. 3A-3C illustrate the connection of an exemplary adapter 300 to the compression fitting 100 illustrated in FIG. 1A. It should be noted that the adapter of the present application may be configured for use with a variety of compression fittings in addition to the compression fitting 100 illustrated in FIG. 1A. Further, as discussed below, the adapter of the present application may be adapted or adjusted such that it can be used with multiple compression fittings having varying sealing shoulder depths.

Similar to the adapter 200 illustrated in FIGS. 2A-2C, the adapter 300 comprises a body portion 302 having a first end 320 and a second end 322, a compression portion 304, and a flange portion 306. As shown in FIGS. 3A-3C, when the adapter 300 is connected to the compression fitting 100, a resilient seal 308 (shown as an o-ring in FIG. 3A) is seated on the first end 320 of the body portion 302 and the first end is inserted into the port 114 of the compression fitting 100. When the adapter 300 is inserted into the port 114 of the compression fitting 100, the seal 308 is positioned between the annular sealing shoulder 120 of the compression fitting body 102 and an annular face 316 of the compression portion 304. As shown in FIG. 3B, an inner annular surface of the flange portion 306 of the adapter 300 is adjacent the annular face 118 of the port 114 when the adapter is inserted into the port. As the nut 110 is threaded onto the body 102 of the compression fitting 100, an interior surface of the nut abuts an outer annular surface of the flange portion 306 to move the adapter 300 axially into the port 114 of the compression fitting. Further, the compression portion 304 of the adapter 300 compresses the seal 308 against the annular sealing shoulder 120 of the compression fitting body 102 to seal the body with the body portion 302 of the adapter.

The adapter of the present application permits a compression fitting to be attached to a fluid system component without using the gasket ring and locking ring of the compression fitting. For example, the adapter 300 provides a fluid tight connection between the compression fitting 100 and the fluid system component 370 (FIG. 3C) without using the gasket ring 106 or the locking ring 108 of the compression fitting. Further, the adapter of the present application circumvents the use of a threaded connection of the compression fitting (see, e.g., FIG. 1B) to attach a threaded fluid system component to the fitting.

An exemplary compression fitting 150 having a female threaded connection 152 is shown in FIG. 1B. As shown, the female threads 154 of the threaded connection 152 are smaller and shallower than the male threads (FIG. 1A) used to connect the nut 110 to the body 102 of the compression fitting 100. In this regard, the male threads used to connect the nut 110 to the body 102 are likely able to withstand higher stresses and pressures than the female threads 154 of the threaded connection 152. In addition, long term creep of the material forming the compression fitting 150 may weaken the female threads 154 of the threaded connection 152 over time as the material moves to relieve stress induced by the fluid pressure of the system and increase the risk of leakage or the female threads stripping. The threads of the fluid system component (e.g., fluid system component 370) attached to the compression fitting 150 may also be made of a harder material than the female threads 154 of the threaded connection 152, thereby increasing the risk of the female threads stripping.

The second end of the body portion may be connected to the fluid system component in a variety of ways, such as for example, with a female threaded interior channel, a male threaded outer surface, a socket, a spigot (e.g., a solvent weld type), a Victaulic joint, or a straight acme thread with an elastomeric seal (i.e., an acme elastomeric type joint). As shown in FIG. 2B, the adapter 200 comprises female threads 212 on at least a portion of the interior channel 224 for connection to the fluid system component. As shown, the female threads 212 are straight acme threads; however, in certain embodiments, other suitable thread types known in the art may work, such as for example buttress threads or unified screw threads. As illustrated in FIG. 3C, the adapter 300 also comprises female threads 312 on at least a portion of the interior channel 324. As shown, the female threads 312 are configured to mate with male threads 360 of a fluid system component 370. Further, the female threads 312 are used in conjunction with a seal 362 (shown as an o-ring in FIG. 3C) on the fluid system component 370 that seals on a smooth bore of the interior channel 324 that is adjacent to the female threads of the interior channel.

Figure 4A:
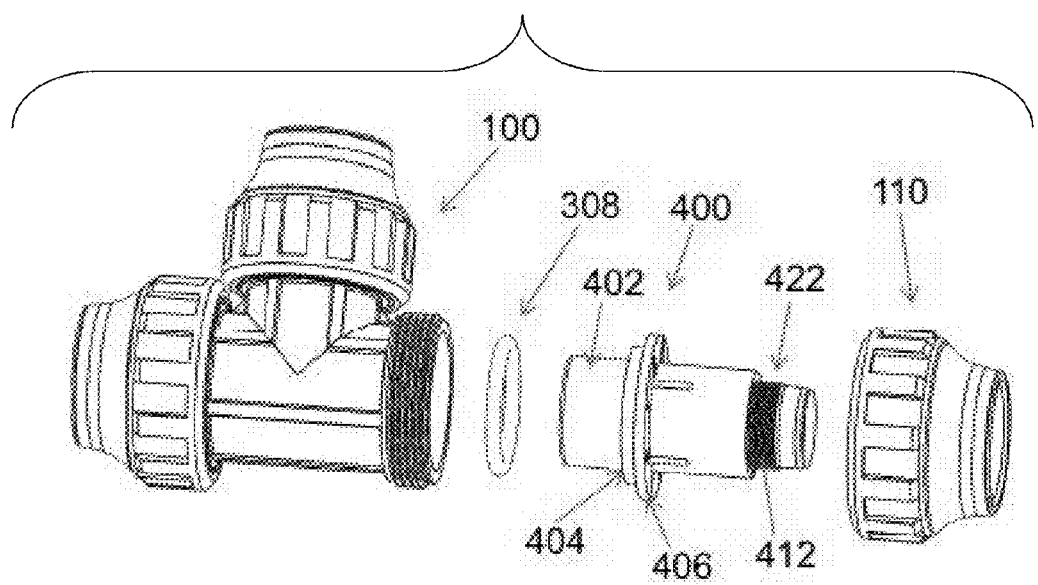
FIGS. 4A and 4B are perspective views illustrating the connection of an exemplary adapter to a compression fitting and a fluid system component according to an embodiment of the present application.
Figure 4B:
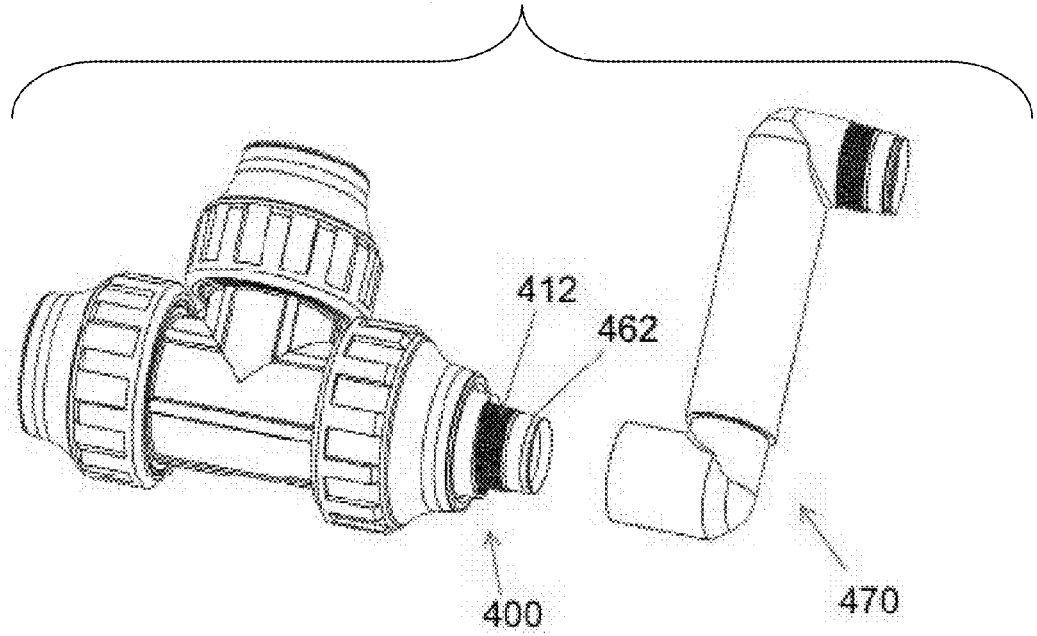

The adapter of the present application may also comprise male threads on the outer surface of the second end to connect the body portion to a fluid system component. For example, FIGS. 4A and 4B illustrate the connection of an exemplary adapter 400 to the compression fitting 100 illustrated in FIG. 1A. Similar to the adapter 200 illustrated in FIGS. 2A-2C and adapter 300 illustrated in FIGS. 3A-3C, the adapter 400 comprises a body portion 402, a compression portion 404, and a flange portion 406. Further, the connection between the adapter 400 and the compression fitting 100 is similar to that of adapters 200 and 300. However, the second end 422 of the body portion 402 of the adapter 400 comprises male threads 412 on the outer surface for connection to a fluid system component 470. As illustrated in FIG. 4B, the male threads 412 on the outer surface mate with female threads of the fluid system component 470. Further, the second end 422 of the adapter 400 comprises a groove 462 for a seal (shown as an o-ring in FIG. 4B) that seals on a smooth bore of the interior of the fluid system component 470.

Referring again to FIGS. 2A-2C, the compression portion 204 of the adapter 200 is an annular ring disposed about the outer surface of the body portion 202. However, the compression portion 204 may take a variety of different forms. For example, the compression portion 204 may include cutouts, notches, openings, or various cross sectional shapes. Further, the compression portion 204 is generally rigid and non-resilient enough such that it compresses the seal against the sealing shoulder of the compression fitting, e.g., the sealing shoulder 120 of the compression fitting 100. However, in some embodiments, a seal is not used with the adapter 200 and the compression portion 204 is resilient and is compressed against the sealing shoulder 120 of the compression fitting 100 to seal the body portion 202 with the body of the fitting. The adapter 200 provides a fluid tight connection between the compression fitting 100 and the fluid system component without using the gasket ring 106 or the locking ring 108 of the compression fitting.

As illustrated in FIG. 2C, an annular face 216 of the compression portion 204 is disposed a distance D from a first annular face 230 of the flange portion 206. The distance D generally ranges between about 0.03 and 1.0 inch. For example, depending on the particular embodiment of the adapter, the distance D may be about 0.38 inch, about 0.4 inch, about 0.89 inch, about 0.9 inch, about 0.99 inch, or about 1.0 inch. Further, the distance D will vary depending on a variety of factors, such as for example: the sealing shoulder depth of the compression fitting (i.e., the distance from the outer face of the port to the annular sealing shoulder of the compression fitting body); the size of the seal (if any) used with the adapter to seal the body portion with the body of the compression fitting; and the desired amount of compression of the seal (or compression portion) when the adapter is connected to the compression fitting.

In some embodiments, the compression portion is removable from the adapter such that the compression portion can be replaced with a similar or different compression portion. As such, the compression portion may be replaced with another compression portion having a different size, shape, material, etc. to permit use of the adapter with a variety of compression fittings. The compression portion may be an annular ring that is separate from the other adapter components. Further, the compression portion may include one or more features that prohibit the compression portion from rotating relative to the body portion of the adapter, such as for example, when the adapter is connected to the compression fitting.

Figure 5A:
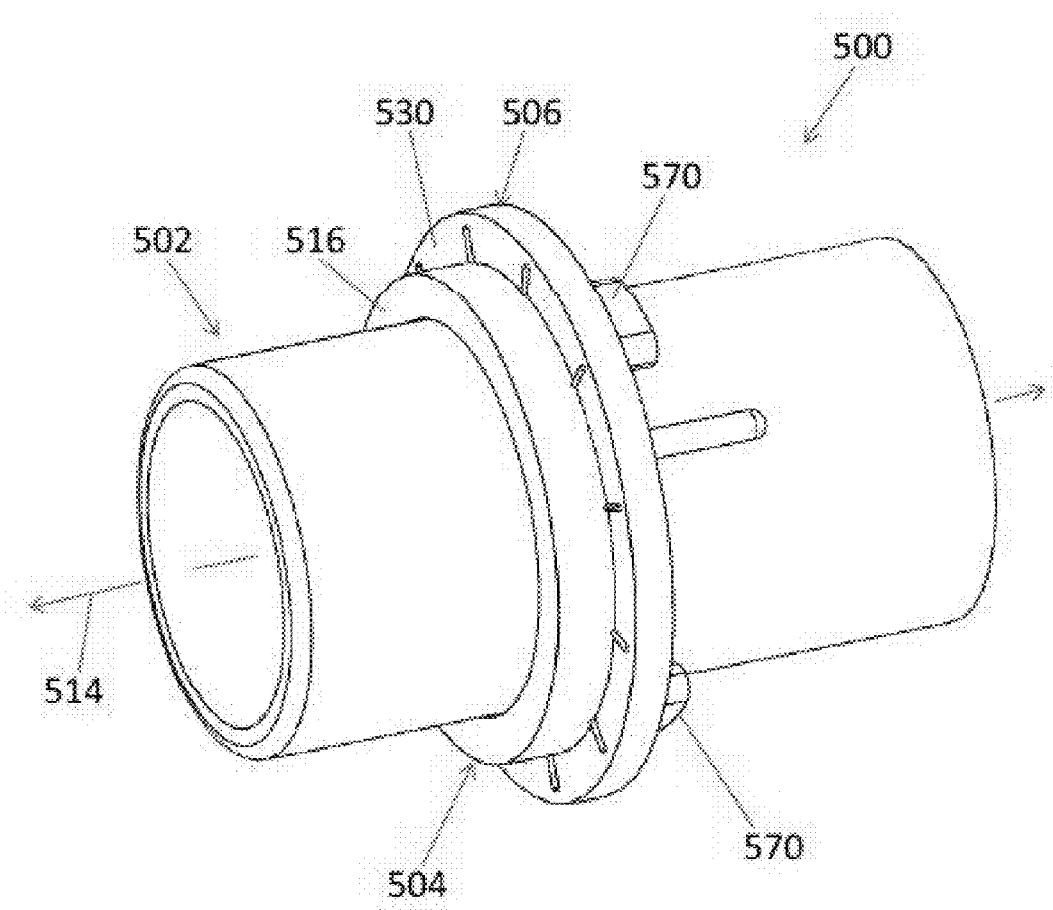
FIGS. 5A and 5B are front perspective and rear perspective views, respectively, of an exemplary adapter according to an embodiment of the present application.
Figure 5B:
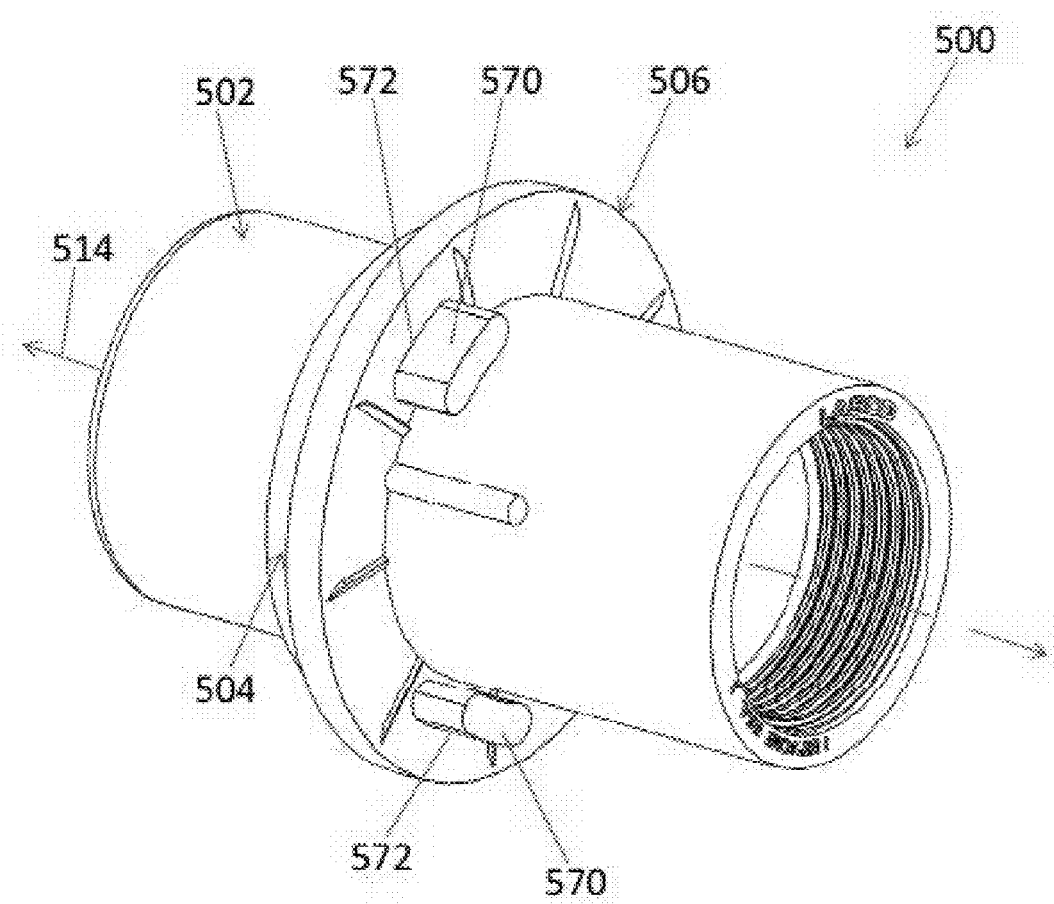

For example, FIGS. 5A and 5B illustrate an adapter 500 of the present application having a removable compression portion 504. Similar to the adapter 200 illustrated in FIGS. 2A-2C, the adapter 500 comprises a body portion 502 having a channel, in which the channel extends along a longitudinal axis 514 of the adapter. As shown, compression portion 504 comprises one or more bosses 570 spaced about an annular surface of the compression portion and extending axially from the annular surface. The flange portion 506 of the adapter 500 comprises one or more openings 572 for receipt of the one or more bosses 570 extending from the compression portion 504. As shown, the adapter 500 comprises three bosses 570 and three corresponding openings 572; however, in other embodiments, more or less bosses and/or openings may be used. When the bosses 570 are inserted into the openings 572 of the flange portion 506, the compression portion 504 is prohibited from rotating relative to the body portion 502 of the adapter 500. Further, the compression portion 504 may be replaced with another compression portion having the same or similar bosses 570. For example, compression portions having various thicknesses may be used to provide various distances between the annular face 516 of the compression portion 504 and the first annular face 530 of the flange portion 506 such that the adapter 500 may be connected to compression fittings having varying sealing shoulder depths.

In some embodiments, the compression portion of the adapter is movable and adjustable relative to the flange portion such that the adapter may be used with multiple compression fittings having varying sealing shoulder depths. For example, the compression portion may be adjustable relative to the flange portion of the adapter to vary the distance between the annular face of the compression portion and the first annular face of the flange portion such that the adapter may be connected to compression fittings having a variety of sealing shoulder depths.

Figure 6A:
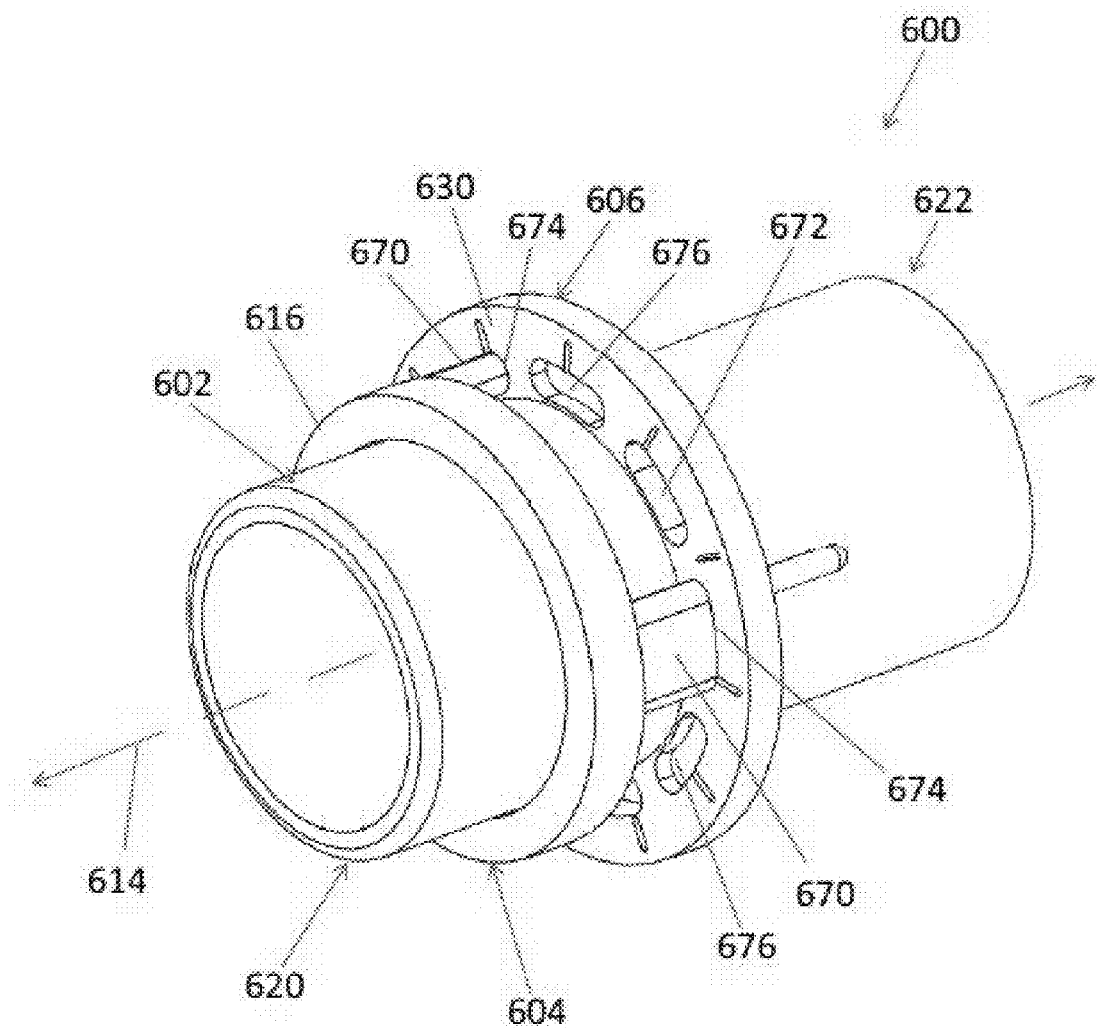
FIGS. 6A-6C are front perspective, rear perspective, and side views, respectively, of an exemplary adapter according to an embodiment of the present application.
Figure 6B:
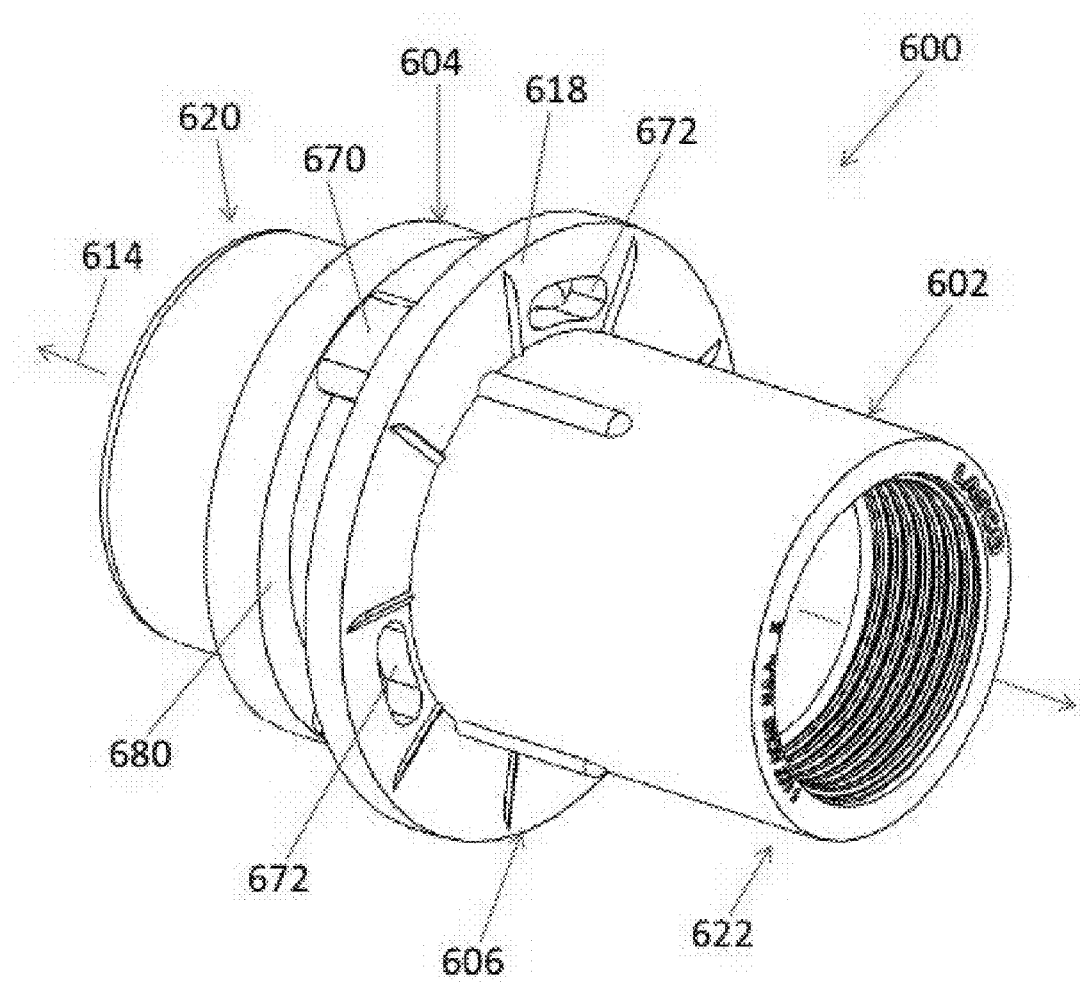
Figure 6C:
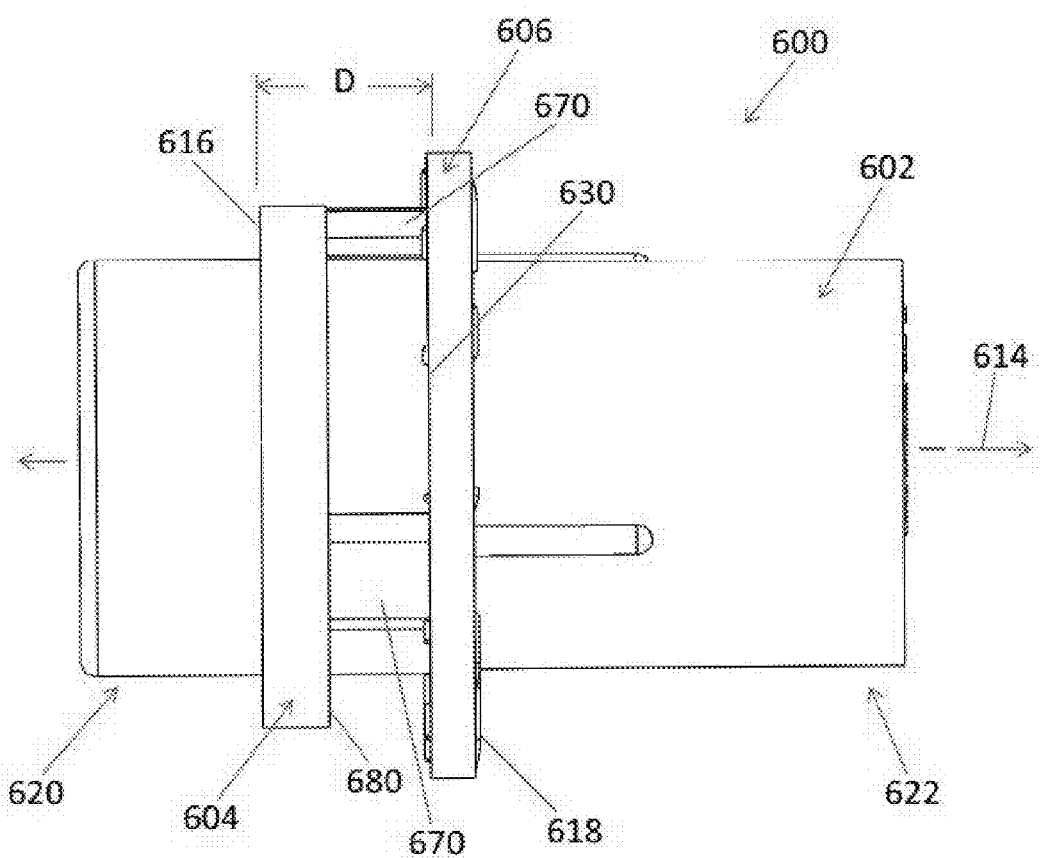

For example, FIGS. 6A-6C illustrate an adapter 600 of the present application having a compression portion 604 that is movable and adjustable relative to the flange portion 606 of the adapter. Similar to the adapter 200 illustrated in FIGS. 2A-2C, the adapter 600 comprises a body portion 602 having a first end 620 and a second end 622, and the body portion has an interior channel that defines a flow path along a longitudinal axis 614 of the adapter. As shown, the compression portion 604 comprises one or more bosses 670 spaced about a second annular surface 680 of the compression portion and extending axially from the second annular surface. The flange portion 606 of the adapter 600 comprises one or more depressions 674 and 676 or openings 672 for receipt of the one or more bosses 670 of the compression portion 604. As shown in FIG. 6A, the flange portion 606 comprises a first set of depressions 674 having a first depth, a second set of depressions 676 having a second depth greater than the first depth, and a set of openings 672 spaced about a first annular face 630 of the flange portion. The adapter 600 comprises three bosses 670 and each set of depressions 674 and 676 or openings 672 comprises three depressions or openings; however, in other embodiments, more or less bosses, depressions, and/or openings may be used. Further, more or less sets of depressions 674 and 676 may be used having varying depths. The bosses 670 of the compression portion 604 are shown inserted into the first set of depressions 674 in FIGS. 6A-6C.

One exemplary method of adjusting the adapter 600 comprises adjusting the compression portion 604 relative to the flange portion 606 of the adapter by moving the compression portion axially relative to the flange portion such that the one or more bosses 670 are moved out of a set of depressions 674 and 676 or openings 672. The compression portion 604 is then rotated relative to the body portion 602 of the adapter 600 and the bosses 670 are aligned with a different set of depressions 674 and 676 or openings 672. The compression portion 604 is then moved axially relative to the flange portion 606 to insert the one or more bosses 670 in the different set of depressions 674 and 676 or openings 672. As a result, the distance D (FIG. 6C) between the first annular face 616 of the compression portion 604 and the first annular face 630 of the flange portion 606 is increased or decreased.

As illustrated in FIG. 6C, the distance D between the first annular face 616 of the compression portion 604 and the first annular face 630 of the flange portion 606 of the adapter 600 may range between about 0.3 and 1.0 inch. For example, the distance D is about 1.0 inch when the bosses 670 are inserted into the first set of depressions 674; about 0.9 inch when the bosses are inserted into the second set of depressions 676; and about 0.4 inch when the bosses are inserted into the set of openings 672. As another example, the distance D can be about 0.98-1.02 inches when the bosses 670 are inserted into the first set of depressions 674; about 0.88-0.92 inches when the bosses are inserted into the second set of depressions 676; and about 0.38-0.42 inches when the bosses are inserted into the set of openings 672. However, the flange portion 606 of the adapter 600 may include more or less depressions having various depths to provide more or less adjustability to the adapter. Further, compression portions having various thicknesses may be used with the adapter 600 to alter the range of adjustability of the adapter.

One exemplary method of connecting the adapter 600 to a compression fitting comprises inserting the bosses 670 of the compression portion 604 in the first set of depressions 674 of the flange portion 606. A seal, such as an o-ring (e.g., the seal 104 shown in FIG. 1A and the seal 308 shown in FIGS. 3A and 4A), is then seated on the first end 620 of the body portion 602 of the adapter 600. The first end 620 of the body portion 602 is then inserted into a port of the compression fitting. If the first annular face 630 of the flange portion 606 is flush with the annular face of the port when the seal is compressed against the sealing shoulder of the fitting, then the nut of the compression fitting is connected to the body of the fitting to connect the adapter 600 to the fitting. If not, the adapter 600 is removed from the port of the compression fitting and the bosses 670 of the compression portion 604 are removed from the first set of depressions 674 and inserted into the second set of depressions 676. The adapter 600 is then reinserted into the port of the compression fitting to determine if the first annular face 630 of the flange portion 606 is flush with the annular face of the port when the seal is compressed against the sealing shoulder of the compression fitting. This process is repeated for the various sets of depressions or openings in the flange portion 606 until the first annular face 630 of the flange portion is flush with the annular face of the port of the compression fitting when the seal is compressed against the sealing shoulder of the fitting.

The adapter of the present application may include features that prohibit rotational movement of the adapter relative to the compression fitting. For example, referring again to FIGS. 2A and 2B, the first annular face 230 of the flange portion 206 of the adapter 200 includes ribs or protrusions 208 that engage the annular face of the port when the adapter is connected to the compression fitting. Further, the second annular face 218 of the flange portion 206 of the adapter 200 includes ribs or protrusions 210 that engage the inner surface of the nut when the adapter is connected to the compression fitting. Referring to FIGS. 2A-2C, rotational movement of the adapter 200 relative to the fitting 100 is inhibited by the rib or protrusions 208 of the first annular face 230 engaging the annular face 118 of the port 114. Further, the ribs or protrusions 210 of the second annular face 218 deter an unthreading rotation of the nut 110. Similarly, referring to FIGS. 6A-6C, the first annular face 630 and the second annular face 618 of the adapter 600 may include features that prohibit rotational movement of the adapter relative to the compression fitting, such as, for example, any of the features described above with reference to FIGS. 2A-2C.

Figure 7:
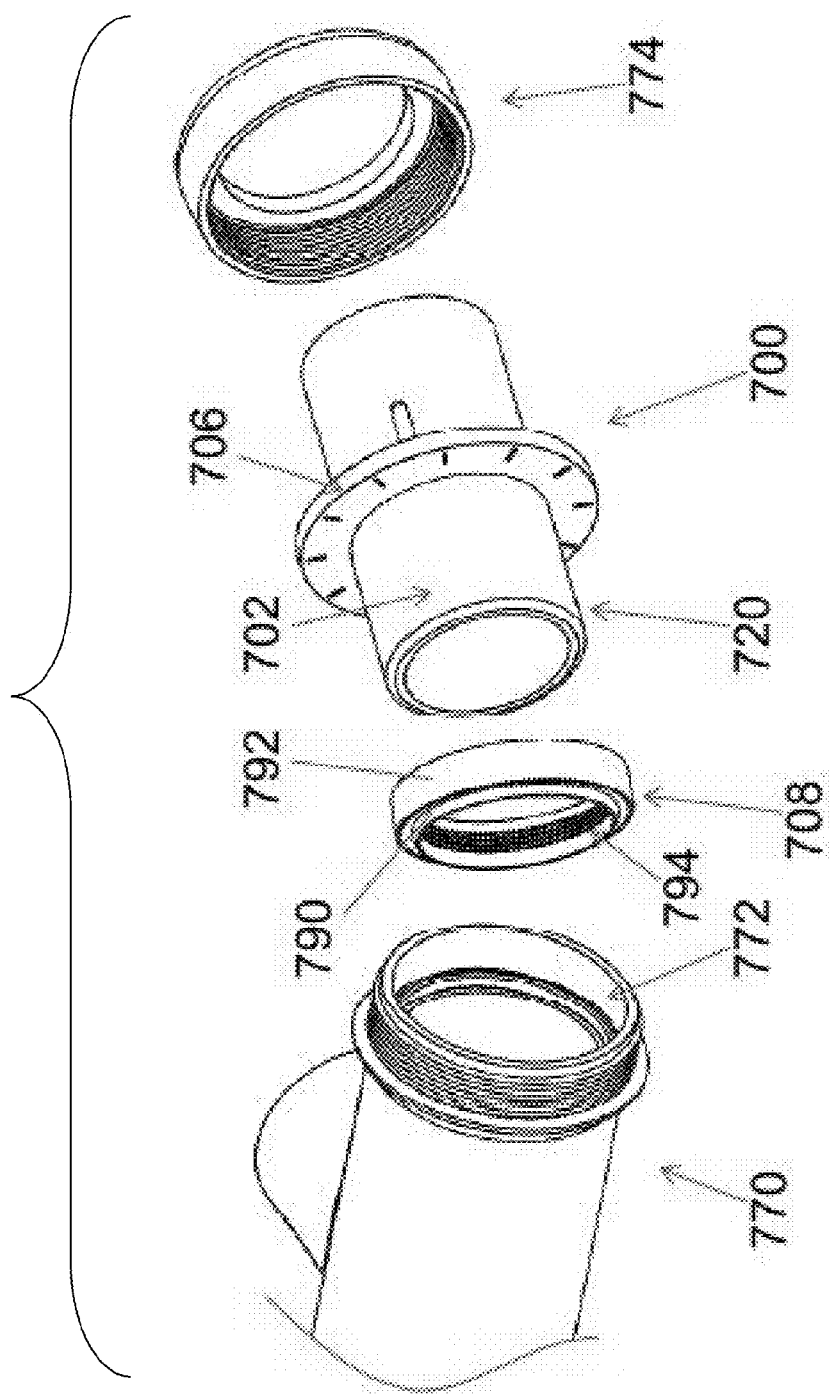
FIG. 7 is a perspective view illustrating the connection of an exemplary adapter to a compression fitting according to an embodiment of the present application.

FIG. 7 illustrates the connection of an exemplary adapter 700 to a compression fitting 770. As shown, a lip seal gasket 708 is seated on a first end 720 of a body portion 702 of the adapter 700. The lip seal gasket 708 comprises a conical shaped lip 790 and ribbing 794 on an inner surface of the gasket that facilitates sealing the gasket with an outer surface of the first end 720. Further, an outer surface 792 of the lip seal gasket 708 seals against an inner surface of a port 772 of the compression fitting 770 when the first end 720 is inserted into the port. A nut 774 is threaded onto the compression fitting 770 body to hold the adapter 700 and the lip seal gasket 708 in position and prohibit removal of the components under pressure. The adapter 700 provides a fluid tight connection between the compression fitting 770 and a fluid system component without using a gasket ring or a locking ring of the compression fitting.

The adapter 700 shown in FIG. 7 may also be used with multiple compression fittings without having to adjust a compression portion of the adapter relative to a flange portion 706. Because the lip seal gasket 708 seals the body portion 702 of the adapter 700 with the compression fitting 770, compressing a seal, such as an o-ring, against a sealing shoulder of the compression fitting is not required to seal the body portion of the adapter with the fitting. Further, torquing the nut 774 of the compression fitting 770 with wrenches (e.g., spanner wrenches) to achieve a sufficient compressive load of a seal against a sealing shoulder of the compression fitting body is not required.

The invention has been described with reference to the preferred embodiments. Modification and alterations will occur to others upon a reading and understanding of this specification. It is intended to include all such modifications and alterations insofar as they come within the scope of the appended claims or the equivalents thereof.

While various aspects and concepts of the invention are described and illustrated herein as embodied in combination in the exemplary embodiments, these various aspects and concepts may be realized in many alternative embodiments, either individually or in various combinations and sub-combinations thereof. Unless expressly excluded herein all such combinations and sub-combinations are intended to be within the scope of the present invention. Still further, while various alternative embodiments as to the various aspects and features of the invention, such as alternative materials, structures, configurations, methods, devices, and so on may be described herein, such descriptions are not intended to be a complete or exhaustive list of available alternative embodiments, whether presently known or identified herein as conventional or standard or later developed. Those skilled in the art may readily adopt one or more of the aspects, concepts or features of the invention into additional embodiments within the scope of the present invention even if such embodiments are not expressly disclosed herein. Additionally, even though some features, concepts or aspects of the invention may be described herein as being a preferred arrangement or method, such description is not intended to suggest that such feature is required or necessary unless expressly so stated. Still further, exemplary or representative values and ranges may be included to assist in understanding the present invention however; such values and ranges are not to be construed in a limiting sense and are intended to be critical values or ranges only if so expressly stated.

We claim:

1. A system for connecting to a fluid system component, comprising:
   a compression fitting having a body, nut, and port with an interior sealing shoulder;
   an adapter for connecting the compression fitting to the fluid system component, the adapter comprising:

a body portion having a first end configured to connect to the port of the compression fitting, a second end configured to connect to the fluid system component, an outer surface, and an interior channel between the first and second ends defining a flow path along a longitudinal axis of the adapter;

a compression portion disposed around the outer surface of the body portion and comprising a compression surface disposed perpendicular to the longitudinal axis of the adapter; and a flange portion disposed around the outer surface of the body portion between the compression portion and the second end, the flange portion comprising an inner surface and an outer surface; and a seal disposed around the outer surface of the body portion between the first end and the compression surface of the compression portion;

wherein, when the adapter is connecting the compression fitting to the fluid system component, the compression surface of the compression portion compresses the seal against the interior sealing shoulder of the compression fitting port to seal the body of the compression fitting with the body portion of the adapter;

wherein the compression portion is adjustable relative to the flange portion of the adapter; and wherein the inner surface of the flange portion comprises one or more depressions configured to receive one or more bosses of the compression portion for adjusting the compression portion relative to the flange portion of the adapter.

2. The system of claim 1, wherein the first end of the body portion, the seal, and the compression portion of the adapter are configured to be inserted into the port of the compression fitting and the adapter is configured such that threading the nut of the compression fitting onto the body of the compression fitting connects the adapter to the compression fitting.

3. The system of claim 2, wherein the adapter is configured such that an interior surface of the nut abuts the outer surface of the flange portion to move the adapter axially into the port of the compression fitting as the nut is threaded onto the body of the compression fitting.

4. The system of claim 2, wherein the adapter is configured such that the inner surface of the flange portion is adjacent a face of the port when the adapter is inserted into the port of the compression fitting.

5. The system of claim 1, wherein the compression portion is moveable relative to the flange portion of the adapter.

6. The system of claim 1, wherein a distance between the compression surface of the compression portion and the inner surface of the flange portion is adjustable between about 0.3 and 1.0 inch.

7. The system of claim 1, wherein the second end of the body portion comprises female threads for connection to the fluid system component.

* * * * *